United States Patent Office 2,936,737
Patented May 17, 1960

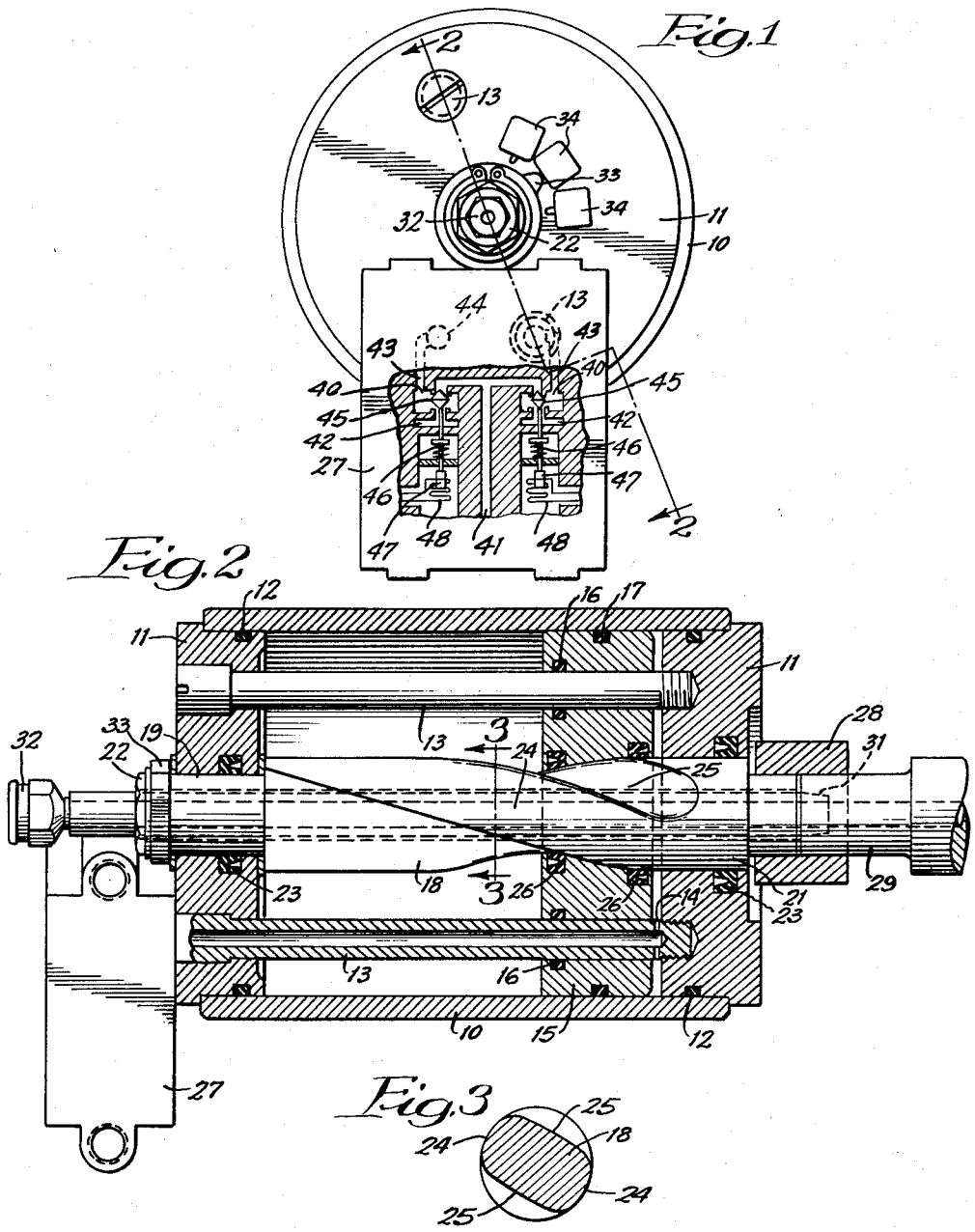

2,936,737

ROTARY ACTUATOR

J Carter Miller, Munster, Ind.

Application July 25, 1955, Serial No. 524,208

2 Claims. (Cl. 121—38)

This invention relates to rotary actuator, and more particularly to a fluid pressure operating device for effecting accurately controlled rotary motion.

For remote operation of rotary valves or other rotary controlled devices in industrial presses and the like, it is necessary to have a rotary actuator which can be accurately controlled from a remote point. Electrical devices for this purpose become complicated and expensive and cannot be used in locations where danger of fire exists and where electricity, except possibly for low voltage control circuits, can not be tolerated. Fluid operated devices as heretofore known are not capable of the precise degree of positioning required and, due to leakage resulting from the inability to effect a tight seal, cannot hold the valve or other device to be controlled accurately in adjusted position.

It is, therefore, one of the objects of the present invention to provide a rotary actuator which is actuated by fluid pressure and which is tightly sealed to be capable of accurate control and of holding in adjusted position over a long period of time.

Another object is to provide a rotary actuator in which longitudinal movement of a piston in a cylinder is converted into rotary motion of a shaft extending through the piston by forming the shaft with a spiral non-circular portion fitting slidably through a complementary opening in the piston.

According to one feature of the invention, the shaft surface is defined by a series of smoothly connected convex curves as by forming opposite sides of a circular shaft with substantially flat surfaces which blend smoothly and uniformly into curved end portions, smoothly to engage an annular sealing ring.

Still another object is to provide a rotary actuator in which fluid is supplied and exhausted from one end of the actuator cylinder, and connections are made to the other end of the cylinder through a hollow internal tie rod therein.

A further object is to provide a rotary actuator in which the piston is held against rotation in the cylinder by one or more tie rods fitting slidably through the piston and securing end closures for the cylinder thereto.

A still further object is to provide a rotary actuator in which control means are provided at one end of the cylinder, including a cam or similar part secured to and movable with the rotary shaft to operate indicating means, indicating the position of the shaft, or to operate control means to limit turning of the shaft to predetermined angular positions.

The above and other objects and features of the invention will be more readily apparent from the following description when read in connection with the accompanying drawing, in which Figure 1 is an end view of a rotary actuator embodying the invention, and Figure 2 is a section on the line 2—2 of Figure 1, and Figure 3 is a section through the shaft on the line 3—3 of Figure 2.

The actuator as shown comprises an elongated tubular body 10 which may be a steel cylinder or the like, open at both ends, and of uniform section throughout. The ends of the body are adapted to be closed by closure plates 11 recessed at their outer surfaces to fit closely into the ends of the cylinder and having enlarged portions at their outer ends to abut against the ends of the cylinder and limit inward movement into the cylinder. The end closure plates may be sealed to the cylinder wall by sealing rings 12, such as conventional O rings.

To hold the closure plates in place on the ends of the cylinder, internal tie rods 13 are provided having enlarged heads fitting into recessed openings in one of the closure plates and threaded into the opposite closure plate. As shown, two tie rods are provided diametrically spaced, or any desired number of tie rods could be employed. One of the tie rods 13 is hollow, as shown at the lower part of Figure 2, and is provided near its threaded end with lateral ports 14 opening into the end of the cylinder near the right hand closure plate.

A piston 15 is slidably mounted in the cylinder and is formed with diametrically spaced bores therethrough, through which the tie rods 13 slidably fit. Annular grooves 16 may be provided around the openings through the piston to receive sealing means such as O rings to effect a fluid-tight seal against the tie rods, and the outer periphery of the piston may be similarly grooved to receive a sealing ring 17 to effect a tight seal against the interior wall of the cylinder.

A shaft 18 is rotatably mounted in the cylinder and for this purpose is formed with cylindrical end portions 19 and 21 extending rotatably through bores in the end plates. The end portion 19 is reduced as shown, and may carry a nut or the like 22 on the exterior of the cylinder to limit axial movement of the shaft. Both end portions of the shaft are sealed in the end plates against fluid leakage by annular sealing rings 23.

The portion of the shaft on the interior of the cylinder is formed with a spiral outer surface non-circular in section, to cooperate with a similarly shaped opening in the center of the piston 15. The spiral non-circular surface may be formed by grinding or cutting opposite faces of a circular shaft with a substantially straight grinding wheel or cutter to produce a section similar to that shown in Figure 3. As there seen, the shaft has relatively narrow end portions as shown by Figure 3, number 24, which are concentric with the shaft axis and which are connected by substantially flat side faces 25. In forming the faces 25 with a flat cutter or grinding wheel, a slight degree of convexity is given to these surfaces which is desirable in the present construction. At the corners where the surfaces meet, they are preferably ground or otherwise formed with short curves which blend the surfaces 24 and 25 smoothly into each other.

The piston 15 is formed with a spiral opening therethrough complementary to the spiral shaft surface so that when the piston moves longitudinally in the cylinder the shaft will be rotated relative to the piston. To prevent leakage between the piston and the shaft, annular sealing rings 26 are mounted in recesses near the opposite faces of the piston. Due to the smooth contour of the shaft, these annular sealing rings can effect a fluid-tight seal against the shaft entirely around its periphery so that fluid leakage around the shaft will be prevented.

To control movement of the piston, fluid is selectively supplied to or exhausted from its opposite ends under the control of a double valve construction indicated generally at 27. Since this valve construction is conventional and of itself forms no part of the present invention, it is not illustrated in detail. However, the left side of the valve, as seen in Figure 1, communicates directly through the end closure plate 11 on which the valve is mounted, with the interior of the cylinder at the adjacent end thereof. The right hand section of the valve communicates with the interior of the hollow tie rod 13 and through the tie rod and ports 14 with the interior of the cylinder at the opposite end. Thus, when the left hand valve is opened to a supply of fluid under pressure, and the right hand valve is open to exhaust, the piston will be moved to the right as seen in Figure 2, and when the valve positions are reversed the piston will be moved to the left. When both valves are closed, fluid will be trapped in the cylinder and the piston will be held in adjusted position, since the fluid cannot leak through the cylinder due to the effective sealing provided by the sealing rings 16, 17 and 26.

The valves, as shown in Figure 1, are of identical construction comprising valve chambers 40 having opposed seats with the seat adjacent to the axis of the unit being connected through a passage 41 to a source of air under pressure, and the opposite seats communicating with exhaust chambers 42, which are connected with the atmosphere through ports not shown. The valve chambers 40 are connected through passages 43 with a port 44 through the adjacent closure plate 11 and with the interior of the rod 13 respectively.

The ports are controlled by double acting valves 45 which are urged against the first named seats by springs 46 to close off the supply of air to the cylinder when the valves are in their normal position. At this time both ends of the cylinder are exhausted and the piston will remain stationary. To shift the valves, solenoid cores 47 are connected thereto and coils 48 are associated with the cores to move them downwardly, as seen in Figure 1, when the coils are energized. The coils 48 may be selectivly energized through any desired type of external control to cause the valves to move selectively downward, thereby to shift the piston in one direction or the other, as desired.

When the left-hand valve is moved, air under pressure will be admitted past the valve through the passage 43 and opening 44 into the left end of the cylinder to move the piston to the right toward the position shown in Figure 2. Similarly, when the right-hand valve 45 is moved, air will be admitted through the rod 13 and port 14 into the right end of the cylinder to shift the piston to the left.

One end of the shaft 18 may be provided with a coupling collar 28 for connection to the stem of a valve or the like, as indicated at 29. It is conventional in many types of valves to make the stem hollow with a bore therethrough as shown at 31, through which the valve can be lubricated. To enable lubrication of the valve when equipped with an actuator embodying the present invention without requiring disassembly, the shaft 18 is made hollow and is formed at one end with a projecting nipple 31 to fit into a lubricant receiving socket in the end of the valve stem. At its opposite end the shaft carries a fitting 32 to receive a nipple similar to the nipple 31, or a conventional lubricating gun, so that lubricant can easily be forced through the shaft 18 and the valve stem to lubricate the valve.

In many installations it is desirable to stop the actuator accurately at predetermined positions, or to provide remote indicating means to indicate the angular position of the actuator and the valve. For this purpose, control means are provided at one end of the cylinder, including the part secured to the rotatable with the shaft, and cooperating with other parts fixed to the adjacent end closure of the cylinder to effect an indicating or controlling operation. As shown in Figure 1, the shaft 18 carries a projecting cam 33 which turns with the shaft and which may successively engage a plurality of control devices 34 which may be electrical switches or fluid valves. As the shaft turns from one position to another, the control devices 34 will be successively actuated and may either control the valves 27 to stop the actuator in a predetermined position or may operate a remote indicator to indicate the actuator position, or both.

In a typical installation, the valves 27 are electrically operated from a remote point, and the control device 34 may be micro switches which either control the operating circuits for the valves or energize a remote indicator, or both. In installations in which the valves are operated mechanically or by fluid pressure, the control devices of 34 may themselves be valves which will cut off the fluid pressure supply to the valves 27, or will control pressure operated indicators or the like.

While one embodiment of the invention has been shown and described herein, it will be understood that it is illustrative only and not to be taken as a definition of the scope of the invention, reference being had for this purpose to the appended claims.

What is claimed is:

1. A rotary actuator comprising a tubular cylinder open at both ends, a pair of end closures fitting into the ends of the cylinder and having projecting shoulders to limit movement thereof into the cylinder, a piston slidable axially in the cylinder, valve means at one end of the cylinder to control the supply and exhaust of fluid to the opposite ends of the cylinder thereby to cause movement of the piston in the cylinder, a plurality of tie rods in the cylinder spaced from its axis and extending slidably through the piston to hold the end closures assembled on the cylinder and to prevent rotation of the piston in the cylinder, one of the tie rods being hollow and communicating at one end with the valve means and at its other end with the interior of the cylinder adjacent to the other end thereof, and a shaft extending axially through the cylinder and the piston, the shaft having a spiral portion non-circular in section and the piston having a complementary opening therein through which the shaft extends to turn the shaft as the piston moves.

2. A rotary actuator comprising a cylinder closed at its ends, a piston slidable in the cylinder, means to supply operating fluid to the ends of the cylinder to move the piston axially therein, a shaft extending through the ends of the cylinder and through the piston and having a spiral portion of non-circular section within the cylinder, the piston having an opening therethrough complementary to the spiral portion to turn the shaft as the piston moves, a cam secured to the shaft outside of the cylinder, and a plurality of control devices fixed to the cylinder in registry with the cam at different angular positions around the shaft to be successively actuated by rotation of the shaft and the cam as the piston moves.

References Cited in the file of this patent

UNITED STATES PATENTS

| 1,056,616 | Wright et al. | Mar. 18, 1913 |
| 1,252,436 | Hickey | Jan. 8, 1918 |
| 1,470,462 | Maiden | Oct. 9, 1923 |
| 1,732,366 | John | Oct. 22, 1929 |
| 1,741,871 | Mitchell | Dec. 31, 1929 |
| 1,951,030 | Nardone | Mar. 13, 1934 |
| 1,951,032 | Nardone | Mar. 13, 1934 |
| 2,468,943 | Parsons | May 3, 1949 |